Figure 6:
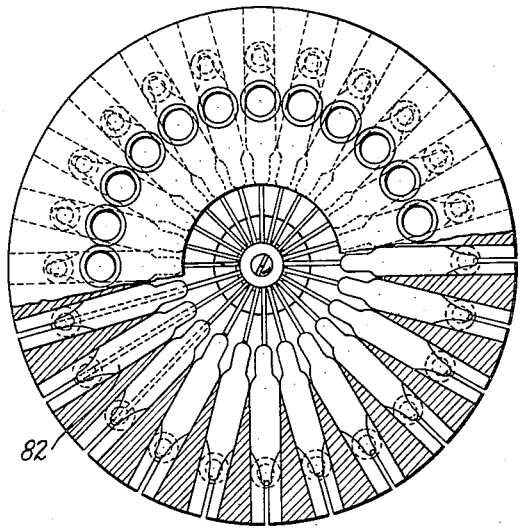

Aug. 24, 1937.          H. W. MOORE          2,090,803
DYNAMIC BALANCING APPARATUS
Filed July 13, 1933          4 Sheets-Sheet 1
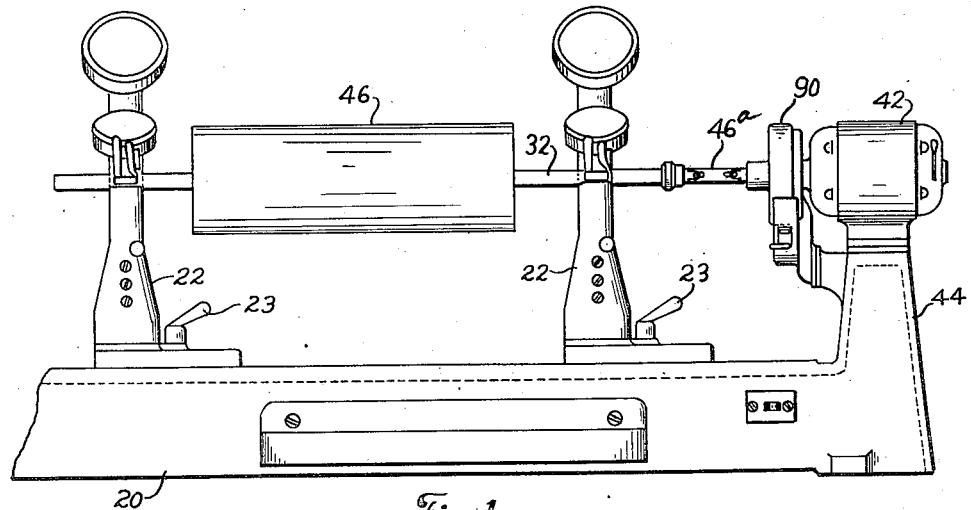
Fig. 1
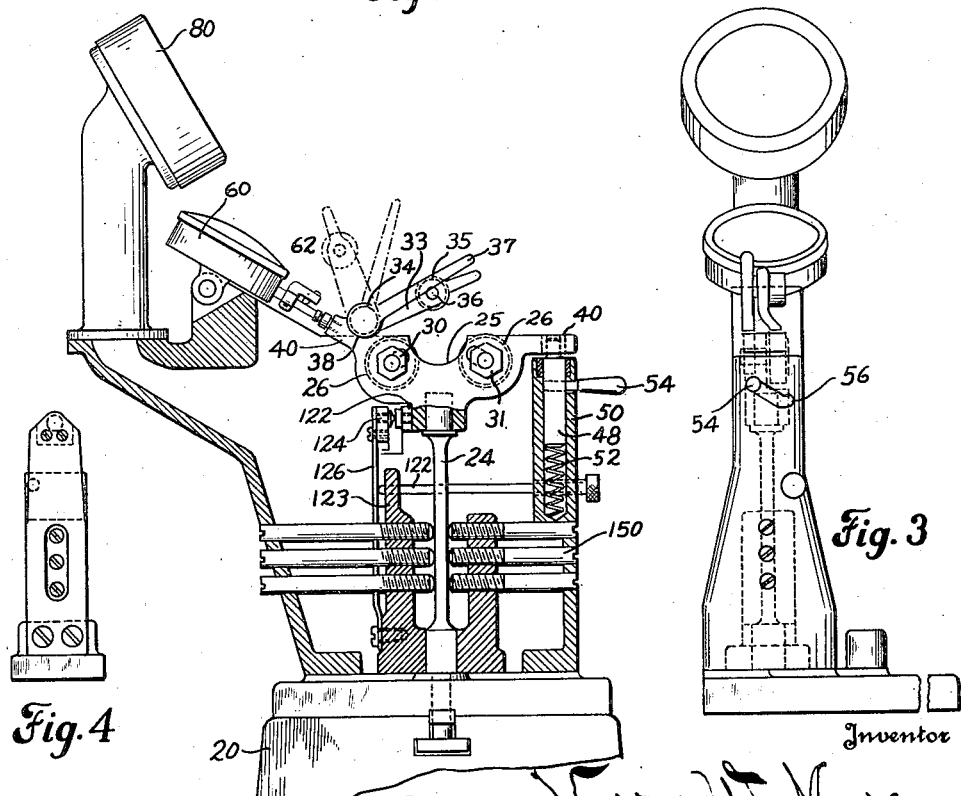
Fig. 2
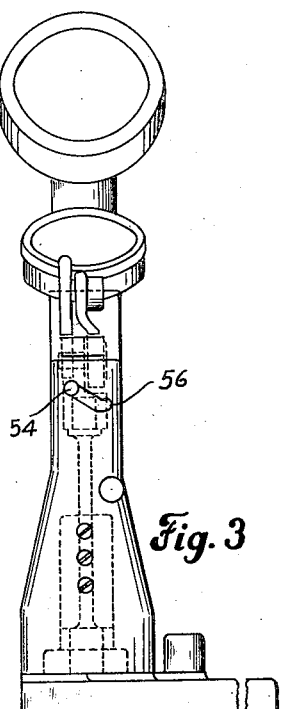
Fig. 3
Fig. 4

Aug. 24, 1937. H. W. MOORE 2,090,803
DYNAMIC BALANCING APPARATUS
Filed July 13, 1933 4 Sheets-Sheet 2
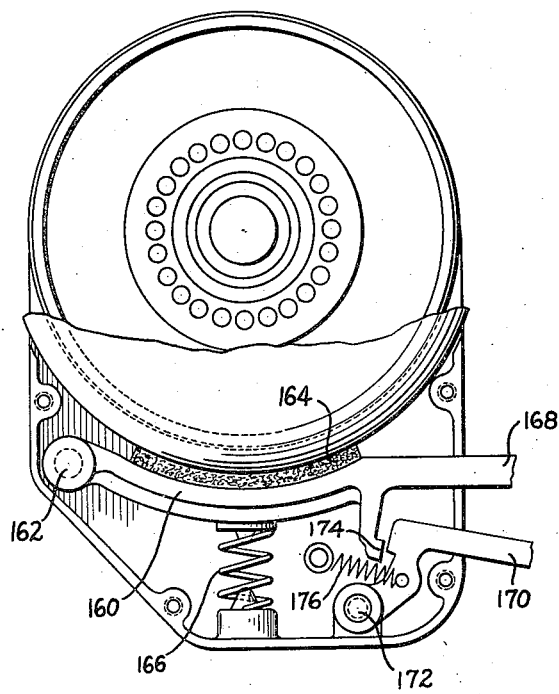
Fig. 9
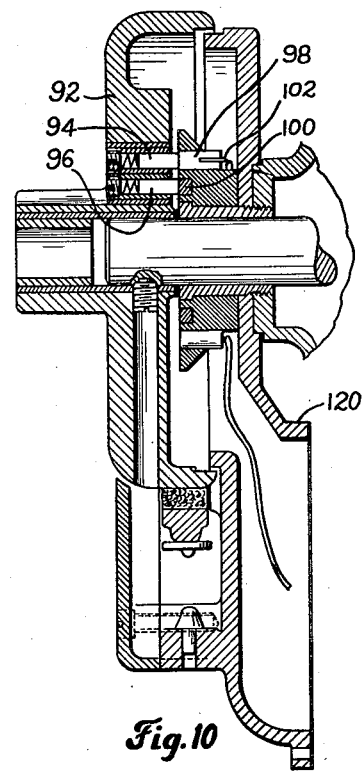
Fig. 10
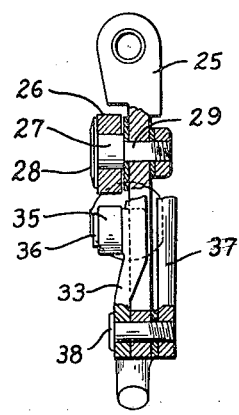
Fig. 11
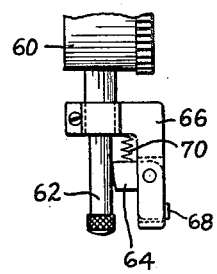
Fig. 5
Fig. 12
Inventor
Harry W. Moore
By Walker & Dybvig
Attorney Aug. 24, 1937.   H. W. MOORE   2,090,803
DYNAMIC BALANCING APPARATUS
Filed July 13, 1933   4 Sheets-Sheet 3

Inventor
Harry W. Moore
By Walker & Sylvia
Attorney

Aug. 24, 1937.  H. W. MOORE  2,090,803
DYNAMIC BALANCING APPARATUS
Filed July 13, 1933  4 Sheets-Sheet 4

INVENTOR
Harry W. Moore
BY Walker & Dybvig
ATTORNEY

Patented Aug. 24, 1937

2,090,803

UNITED STATES PATENT OFFICE 2,090,803

DYNAMIC BALANCING APPARATUS

Harry W. Moore, Dayton, Ohio

Application July 13, 1933, Serial No. 680,225

7 Claims. (Cl. 73—51)

This invention relates to a dynamic balancing apparatus and more particularly the method of and means for rapidly ascertaining and visually indicating the location and amplitude of unbalanced area of a rotating body.

A condition of unbalance in a rotating mass induces vibratory forces and reactions in the mounting of the unbalanced body which are highly objectionable and injurious to the equipment in which the body may be employed. Such vibratory reactions, however, are utilized in the present instance to operate indicating means by which the unbalanced condition is accurately and quickly defined both as to magnitude and location.

The purpose of the present dynamic balancing method is to measure and locate the magnitude of unbalance in terms of two planes which can be selected for correction and to compensate such condition of unbalance by adding or removing material in or near these planes. To do either, two indicating means are employed one of which measures the range or magnitude of the induced vibratory movement of the rotating mass indicating the amplitude of the unbalanced condition; the other, which is of multiple character, operates to indicate the angular position of the point of unbalance in relation to different planes of rotation.

The object of the invention is to simplify the construction as well as the means and mode of operation of dynamic balancing apparatus for rotating bodies whereby such apparatus will not only be cheaper in construction but will be more efficient in use, automatic in its action, accurate in results, rapid in operation, easily controlled and unlikely to get out of repair.

A further object of the invention is to provide an automatic means for measuring and accurately indicating the magnitude or amplitude of the unbalanced condition existing in the rotating body.

A further object of the invention is to provide automatic means for determining and indicating the relative angular position of the points of unbalance and to further ascertain and indicate such angular point of unbalanced condition in different planes of rotation.

A further object of the invention is to provide an apparatus into which the body to be tested can be quickly and readily installed and removed and wherein the test may be made rapidly by a comparatively unskilled operator.

A further object of this invention is to provide self-aligning bearings or supports for the rotating body whereby bodies of various sizes may be tested in the same apparatus without interchange of parts.

A further object of the invention is to provide a simple but sturdy apparatus suitable for mass production use which will enable quantity testing to be conducted with rapidity and accuracy.

Another object of this invention is to provide an apparatus into which bodies of various sizes may be balanced by changing the natural period of vibration of the vibratory support.

Another object of this invention is to provide pairs of indicators located at opposite ends of the body to be tested whereby the operator may make observations without leaving his position for making observations.

Another object of this invention is to test a body during the acceleration thereof.

Another object of this invention is to limit the speed of the motor to ten to twenty per cent above the critical frequency of the support for the particular body.

Another object of this invention is to provide a variable speed motor whereby the speed of balancing device may be limited to ten to twenty per cent above the normal operating speed of the particular body to be tested.

Another object of this invention is to provide an electrical indicator for indicating the angle of unbalance that is accurate, dependable and unlikely to get out of repair.

Figure 7:
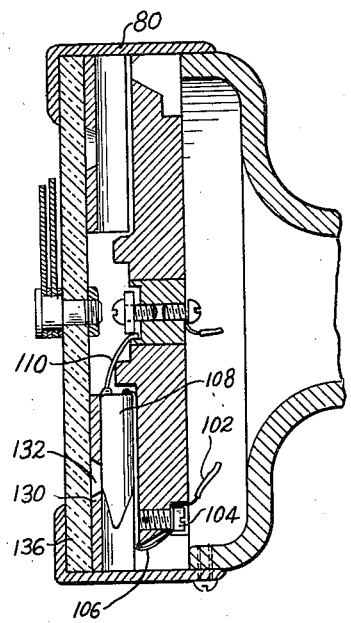
Figure 8:
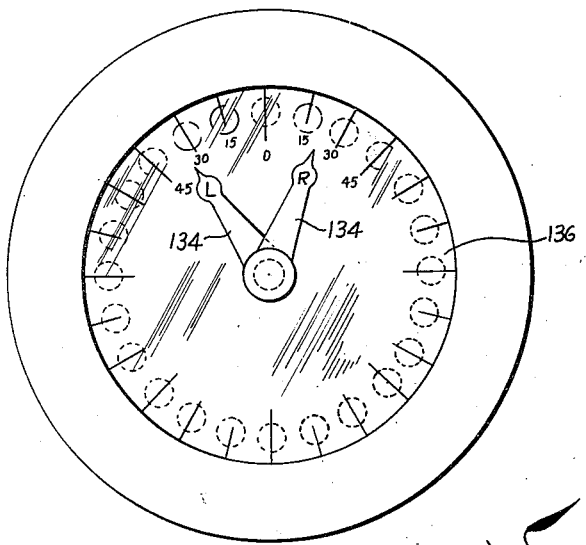
Figure 13:
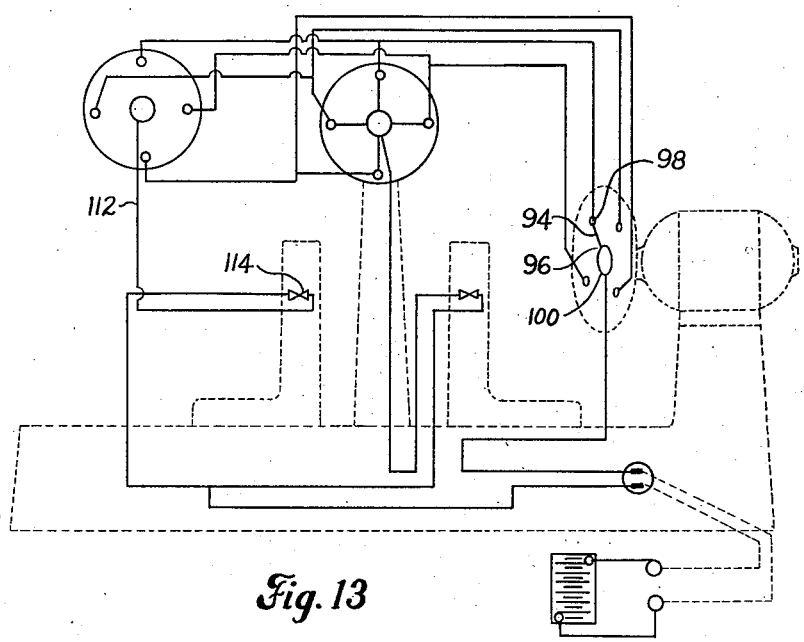
Figure 14:
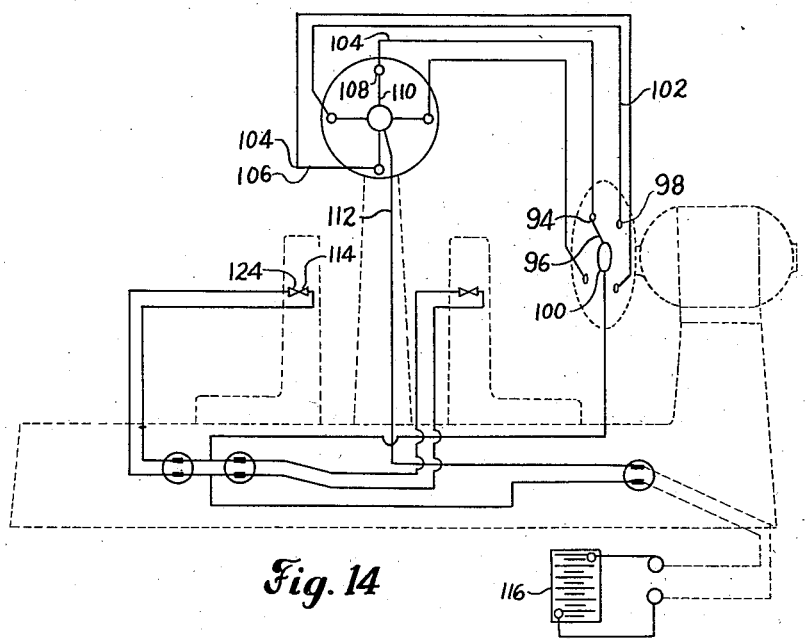

In the following drawings Fig. 1 discloses a front elevation of the balancing machine, Fig. 2 is a sectional view taken substantially on the line 2—2 of Fig. 1 and drawn to a larger scale. Fig. 3 is a detailed view of one end of the balancing machine drawn to a larger scale than Fig. 1. Figs. 4 and 5 show detailed views. Figs. 6, 7, and 8 are detailed views of the mechanism showing the position of angle of unbalance. Figs. 9 and 10 show detailed views of the commutator mechanism. Figs. 11 and 12 are enlarged detailed plan views of parts carried by the heads. Figs. 13 and 14 show schematic wiring diagrams of the electric circuit used in the balancing machine.

Like parts are indicated by similar characters of reference through the several views.

Referring to the drawings, 20 is the base, or bed, of the apparatus upon which are adjustably mounted two or more upright rigid frames 22 engaging in ways or grooves in the bed 20 for sliding movement toward and from each other while maintaining their parallel relation. The adjustable frames 22 are locked in adjusted position by clamps 23. Carried by each frame 22 is a flexible standard 24 fixedly mounted upon the bottom of a frame at its lower end and free at its top for to and fro vibratory motion. Carried at the upper end of each of the vibratory standards 24 is a mounting head 25 including aligning anti-friction rollers 26. As shown in Fig. 11, the rollers 26 are preferably rotatably mounted upon pintles 27, each provided with a head 28 and a reduced portion 29 seated in a slot 30 in the head 25 and held in adjusted position by a nut 31 threadedly engaging the reduced portion 29 for clamping the roller in position. The rollers 26 are thus mounted upon each head providing a support for the shaft 32 of the rotating body. After the rotating body has been placed upon the rollers 26, an arm 33 pivotally mounted at 34 that carries a roller 35 rotatively mounted upon a pintle 36 fixedly attached to the arm 33, is rotated from the dot and dash position shown in Fig. 2 to the full line position. The threads on the end 37 of a pintle 38 cooperate with the threaded member 39 provided with a handle 39' to clamp the arm 33 in position when the handle 39' is rotated from the dot and dash line position to the full line position. From this it may readily be seen that it is not necessary to adjust the rollers 26 to accommodate various sizes within a limited range as the shaft may rest upon the rollers 26 and any variation in the size of the shaft within a limited range is absorbed by the position of the lever 33 carrying the roll 35. When bodies having shafts differing greatly in diameter are to be tested, the rollers 26 are then adjusted so as to accommodate the various sizes of shafts.

The head 25 is formed with oppositely extending arms 40 which cooperate with meters or gages to measure and indicate the magnitude and time of the vibratory action of an unbalanced rotating body carried upon the rollers 26 as will appear more fully later. The body to be tested is mounted for free rotary motion upon the rollers 26 of the respective heads 25 and is driven at a comparatively high rate of speed by an electric motor 42 mounted upon a pedestal 44 arising from the base or bed 20 of the apparatus. The driving motor 42 is connected with the rotary body under test by a flexible drive shaft 46a which permits unrestricted to and fro motion of the driving body upon the vibratory supporting standards 24 while maintaining rotary driving connection therewith. In Fig. 1 there is indicated a motor or armature 46 mounted in the apparatus for test. The shaft 32 of the armature 46 is mounted in the self aligning antifriction rollers 26 of the respective heads 25, each of which is independently supported by a flexible standard 24, the shaft 32 being operatively connected with the driving motor 42 by the shaft 46a.

A detent plunger 48 is maintained in a position on hub 50 upon each frame 22 for locking engagement with the adjacent vibratory mounting head 25 under influence of a spring 52. The detent plunger is provided with a radial stud or handle 54 engaging in a spiral cam groove 56 which acts to retract and hold the detent plunger 48 in inoperative position upon partial rotation of the plunger by means of the handle 54. The detents are independently operable so that the mounting heads at either end of the rotary body being tested may be held immovable while the mounting head at the opposite end of the body is permitted to vibrate freely.

The rotation of an unbalanced body carried by the rollers 26 of the mounting heads 25 induces a to and fro vibratory motion of the body upon the standards 24, the extent of which for a given speed is proportionate to the degree of unbalance. To determine the maximum extent of vibratory motion resulting from rotation of the unbalanced body, there is mounted upon each frame 22 at one side of the vibratory mounted head 25 a gage 60. This gage is actuated through a reciprocatory operating stem 62 by thrust pressure of the head 25 in its vibratory motion. To conveniently arrest the movement of the operating stem 62, a friction detent 64 pivoted in the mounting 66 is secured to the plunger guide of the gage 60, serving to hold the stem 62 in its restrictive position to which it has been moved by the impact of the vibratory head. This detent 64 has at one end a push button 68 which is pivoted slightly above its center line and hence has a slight eccentric cam action against the plunger 62 under influence of a spring 70. The plunger is instantly released by pressing the push button 68 which is limited in its movement by its support 72 integral with 66.

While the gage 60, which has been described, indicates the degree of unbalanced conditon, this is not enough as the angular position of the point of unbalance must be determined. For this purpose there is employed a stationary head 80 disclosed in detail in Figs. 6, 7 and 8, that is provided with a plurality of neon or other suitable lights 108 radially arranged, certain of which are periodically illuminated to indicate the angle of unbalance as will appear more fully later.

Rotated by the motor 42 is a commutator assembly or distributor 90, the rotating parts of which are rotated at a speed coincident of that with the shaft 32 and body under test. The commutator 90 includes a rotary drum 92 having mounted therein a pair of brushes 94 and 96 electrically connected to one another and contacting the stationary commutator segments 98 and the slip ring 100 respectively. Each of the stationary commutator segments 98 are connected by a suitable lead 102 shown in Fig. 10, to a terminal 104 shown in Fig. 7 connected by a conductor 106 leading to one terminal of a neon light 108 having its other terminal 110 connected to a common return 112 having connected in series therewith make and break contacts 114 and 124. The return lead 112 is connected to a terminal of the battery 116 having its other terminal connected to the stationary slip ring 100. The commutator segments 98 and the slip ring 100 are non-rotatively mounted in an insulated support carried by a stationary member 120 carried by the standard 44.

The contact 114 is mounted upon the head 25 but preferably insulated therefrom. Upon vibratory motion of the head 25 this contact 114 has operative engagement with the complementary contact 124 yieldingly mounted upon the frame 22. The contact 124 is preferably mounted upon the leaf spring 126, carried by the base of the standard 22. The leaf spring is limited in its movement towards the standard 24 by an adjustably mounted stop 122 threadedly engaging member 123 of the standard 22. At each vibratory movement of the head 25, the contact 114 impinges upon the contact 124 thereby closing the electrical circuit and momentarily energizing the signal lamp 108 that happens to have its circuit closed through its commutator segment 98 contacting the brush 94. The contact 124, which is adjustably mounted about its connection, may be adjusted in proportion to the degree of maximum deflection of the vibratory supporting standard 24. This contact occurs, of course, only when the point of unbalance is passing a given radial point which, due to inertia, resistance of the vibratory standard 24, and momentum of the body under test or speed of rotation, may not be, indeed is seldom if ever, coincident with the position of the contacts 114 to 124.

However, having signaled the passing of the unbalanced point by the intermittent closing of the circuit and resulting energization of a limited group of lamps, the exact location of the point of unbalance may be mathematically determined by established formulae employing speed, weight, and resistance as factors, which factors, of course, vary with different apparatus and different bodies to be tested.

The signal lamps 108 are enclosed within an apertured shield 130, the apertures of which are arranged in a circle. The apertures 132, preferably countersunk, as at 131 to make the neon lamps more easily seen, especially at an angle. The brushes 94 and 96, being rotated in unison with the body under test, the relative position of the body at the moment of the closing of the signal circuit is readily determined by observing the radial position of the signal lamps energized through the openings 132 at the moment of illumination of the lamps energized. By observing the angular relation of the illuminated lamps, the radial position of the unbalance of the body under test is determined. Manually adjustable markers or pointers 134 may be provided upon the dial 136 which, by being adjusted to agree with the radial position at which the signal lamps are illuminated, serve to retain the indication for reference.

Any number of vibratory heads may be electrically connected with the same commutator and a plurality of angular indicators by connecting the contacts 114 and 124 of the several heads 25 in parallel and likewise connecting each group of lamps 102 in parallel as may be seen from the schematic diagram shown in Fig. 13. By drawing the movable contact carrying lever 126 of any one or more heads beyond the range of vibratory motion of the corresponding mounting head, or by movably locking the head, such contacts may be rendered inoperative, and readings may be taken from other vibratory heads as well upon the angular indicator carried by the head. That is, a pair of contacts 114 and 124 and an angular indicator for each vibratory head and mounted adjacent the head, may be provided so that the observer may take a reading without moving from the place of observation adjacent the vibratory head 25. By taking readings from different mounting heads separately, not only as to the magnitude of the unbalanced condition indicated by the gage 60, but also the angular position of the point of unbalance, the condition of unbalance may be accurately determined in relation to different planes of rotation. Thus a condition of unbalance may be quickly and accurately determined in two respects, to wit, angular and amplitude or magnitude.

In many structures it is desirable to determine the relative balance in a number of different planes of rotation, as for example, in extended crank shafts such as illustrated in my co-pending application Serial No. 582,327, filed December 21, 1931, for dynamic balancing apparatus. In such case the number of frames 22 with their corresponding indicators and a number of vibratory standards and mounting heads carried thereby, are correspondingly increased. These heads may all be operated simultaneously and by locking one or more of the heads they may be vibrated independently and separate readings thus taken at different points throughout the length of the body being tested.

In the past it has been the common practice to make all observations on the instruments when the body to be tested is decelerated which is accomplished by bringing the body up to full speed, then turning the power off and taking the readings when the speed of the body is dying down. Applicant uses an A. C. repulsion motor having substantially uniform acceleration from zero speed to full speed whereby the observations or readings may be taken when the motor accelerates its speed. This is possible due to the characteristics of the acceleration curve which has a substantially uniform acceleration from zero speed to maximum speed. By this method, the usual period for bringing the body to be tested to full speed is utilized by the operator in making his observations, and after the observations are made the motor circuit is opened, the brake applied, as will be described more fully later, and the body to be tested brought to a standstill in a very short period of time, so as to save time in testing.

As the choicest speed for making the observations is within ten per cent to either side of the critical frequency of the vibratory support, it is desirable to have the motor adjusted for maximum speed at not greater than twenty per cent and not less than ten per cent above the critical frequency of the support. This critical frequency is a function of the weight of the body in that the critical frequency for heavier bodies is lower than the critical frequency for lighter bodies as is well known to those skilled in the art.

The motor has been provided with a brush shifting lever 140 whereby the speed of the motor may be changed so as to not exceed twenty per cent nor less than ten per cent above the critical speed of the support for the particular body to be tested. Thus with the use of the variable speed motor the entire range of frequencies of the supports for various bodies to be tested may be covered.

Certain testing problems are encountered that require the body to be tested at a particular frequency or for a particular number of revolutions per minute. For example, a body that normally rotates at 1400 R. P. M. having the same weight and shape as another body designed to normally rotate at 1800 R. P. M. should not be tested at the same frequency. For this reason it has been found desirable to provide an adjustment of the support whereby the critical frequency thereof for a particular weight supported thereon may be changed. This has been accomplished by changing the effective length of the standard 24 by the adjusting screws 150, shown in Figs. 2, 3, and 4.

Thus the critical frequency of the vibratory supports may be changed to correspond to the normal speed of operation of the body tested whereby it may be balanced at its normal speed.

Likewise it may be found desirable to adjust one of the standards for one period of vibration and another standard for another period of vibration in case a body is being tested wherein the effective weight near one end of the body differs greatly from the effective weight of the other end.

In mass production it is desirable to have the body come to rest in a relatively short period of time. In the present embodiment a braking mechanism including a brake shoe 160, shown in Fig. 9, is pivotally mounted at 162 and provided with a brake lining 164 biased against the rotary member 92 by a helical spring 166. By manually moving the brake shoe 160 away from the brake drum 92, through the handle 168, a latch 170 pivoted at 172 engages a detent 174 in the brake shoe 160 to lock the brake in an inoperative position. The latch 170 is biased against the detent 174 by a spring in tension 176. After the completion of a testing operation, the brake is released by manually moving the latch 170 in a down position thereby permitting the helical spring 166 to bias the brake into engagement with the brake drum 92.

For small machines, instead of having an indicator 80 for each of the standards for indicating the angle of unbalance, one dial may be mounted either upon the standard or near the motor housing similar to the disclosure in my copending application above referred to. Fig. 14 discloses a circuit arrangement that may be used when only one indicator 80 has been used.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. In a balancing machine, a device for indicating the angle of unbalance of a body, said device including a dial having a plurality of radially mounted neon lights and a distributor having a contact rotating with the body for periodically energizing lights connected through the distributor in response to the angle of unbalance of the body to be tested.

2. In a balancing machine, a device for indicating the angle of unbalance, said device including a plurality of neon lights circumferentially arranged, a distributor associated with said lights, and means for periodically energizing said distributor, said means responding to the angle of unbalance of said body thereby indicating the angle of unbalance by energizing one or more of said lights.

3. A balancing machine having a plurality of vibratory supports arranged to support a rotating body to be tested, all of which may be selectively locked normally leaving one unlocked, the combination comprising a source of electrical energy, a pair of contacts one of which is mounted for movement with the unlocked vibratory support, the other being adjustably mounted in the path of the first contact, a distributor device connected in series with said source of energy and in series with said contacts, said distributor device including a stationary contacting surface and a rotatable contacting surface driven in response to the rotation of the body to be tested, said rotatable contacting surface being connected in series with a rotatable distributor contact engaging in seriatim a plurality of circumferentially arranged stationary contacts, and a plurality of neon lights, one neon light for each of said circumferentially arranged contacts, some of which are illuminated when the unbalance of the body to be tested closes the first pair of contacts to thereby indicate the angle of unbalance.

4. A balancing machine having a plurality of vibratory supports arranged to be selectively locked normally leaving one support unlocked whereby the vibratory movement caused by the unbalance of the rotary body to be tested mounted upon said supports is confined to the unlocked vibratory support, including an electric circuit having a source of energy, a plurality of pairs of contacts connected in parallel one pair for each of said supports, one contact of said pair being mounted for movement with the vibratory support the other adjustably mounted in the path of the movable contact, a distributor device connected in series with said source of energy and in series with said contacts, said distributor device including a stationary contacting surface and a rotatable contacting surface driven in response to the rotation of the body to be tested, said rotatable contacting surface being connected in series with a rotatable distributor contact engaging in seriatim a plurality of circumferentially arranged stationary contacts, a plurality of groups of neon lights connected in parallel, there being one group of lights for each vibratory support, one terminal of each neon light being connected in series with one of said circumferentially arranged stationary contact bars, there being one neon light in each group for each of said bars, the other terminal of said neon light being connected to one of the contacts associated with its vibratory support whereby the angle of unbalance will be registered by the illumination of some of the neon lights associated with the unlocked vibratory support.

5. A balancing machine having a plurality of vibratory supports arranged to support a rotating body to be tested, all of which may be selectively locked normally leaving one unlocked, the combination comprising a source of electrical energy, a pair of contacts one of which is mounted for movement with the unlocked vibratory support, the other being adjustably mounted in the path of the first contact, a distributor device connected in series with said source of energy and in series with said contacts, said distributor device including a stationary contacting surface and a rotatable contacting surface driven in response to the rotation of the body to be tested, said rotatable contacting surface being connected in series with a rotatable distributor contact engaging in seriatim a plurality of circumferentially arranged stationary contacts, a plurality of neon lights, one neon light for each of said circumferentially arranged contacts, some of which are illuminated when the unbalance of the body to be tested closes the first pair of contacts to thereby indicate the angle of unbalance and a plurality of adjustable indicators mounted for adjustment with respect to said neon lights, there being one indicator for each vibratory support so that the angle of unbalance may be indicated by the indicator for the vibratory support free to vibrate adjusted with respect to the illuminated lights.

6. A balancing machine having a plurality of vibratory supports arranged to support a rotating body to be tested, the combination comprising a source of electrical energy, a pair of contacts one of which is mounted for movement with the vibratory support, the other being adjustably mounted in the path of the first contact, a distributor device connected in series with said source of energy and in series with said contacts, said distributor device including a stationary contacting surface and a rotatable contacting surface driven in response to the rotation of the body to be tested, said rotatable contacting surface being connected in series with a rotatable distributor contact engaging in seriatim a plurality of circumferentially arranged stationary contacts, and a plurality of neon lights, one neon light for each of said circumferentially arranged contacts, some of which are illuminated when the unbalance of the body to be tested closes the first pair of contacts to thereby indicate the angle of unbalance.

7. A balancing machine having a plurality of unlocked vibratory supports, including an electric circuit having a source of energy, a plurality of pairs of contacts connected in parallel one pair for each of said supports, one contact of said pair being mounted for movement with the vibratory support the other adjustably mounted in the path of the movable contact, a distributor device connected in series with said source of energy and in series with said contacts, said distributor device including a stationary contacting surface and a rotatable contacting surface, driven in response to the rotation of the body to be tested, said rotatable contacting surface being connected in series with a rotatable distributor contact engaging in seriatim a plurality of circumferentially arranged stationary contacts, a plurality of groups of neon lights connected in parallel, there being one group of lights for each vibratory support, one terminal of each neon light being connected in series with one of said circumferentially arranged stationary contact bars, there being one neon light in each group for each of said bars, the other terminal of said neon light being connected to one of the contacts associated with its vibratory support whereby the angle of unbalance will be registered by the illumination of some of the neon lights associated with the unlocked vibratory support.

HARRY W. MOORE.